Aug. 26, 1924.  1,506,683
W. I. STAAF
FLUID METER
Original Filed March 2, 1920  2 Sheets-Sheet 1

Inventor
Werner I. Staaf,
By Ashwell, Byrnes Pamelee
Attorneys.

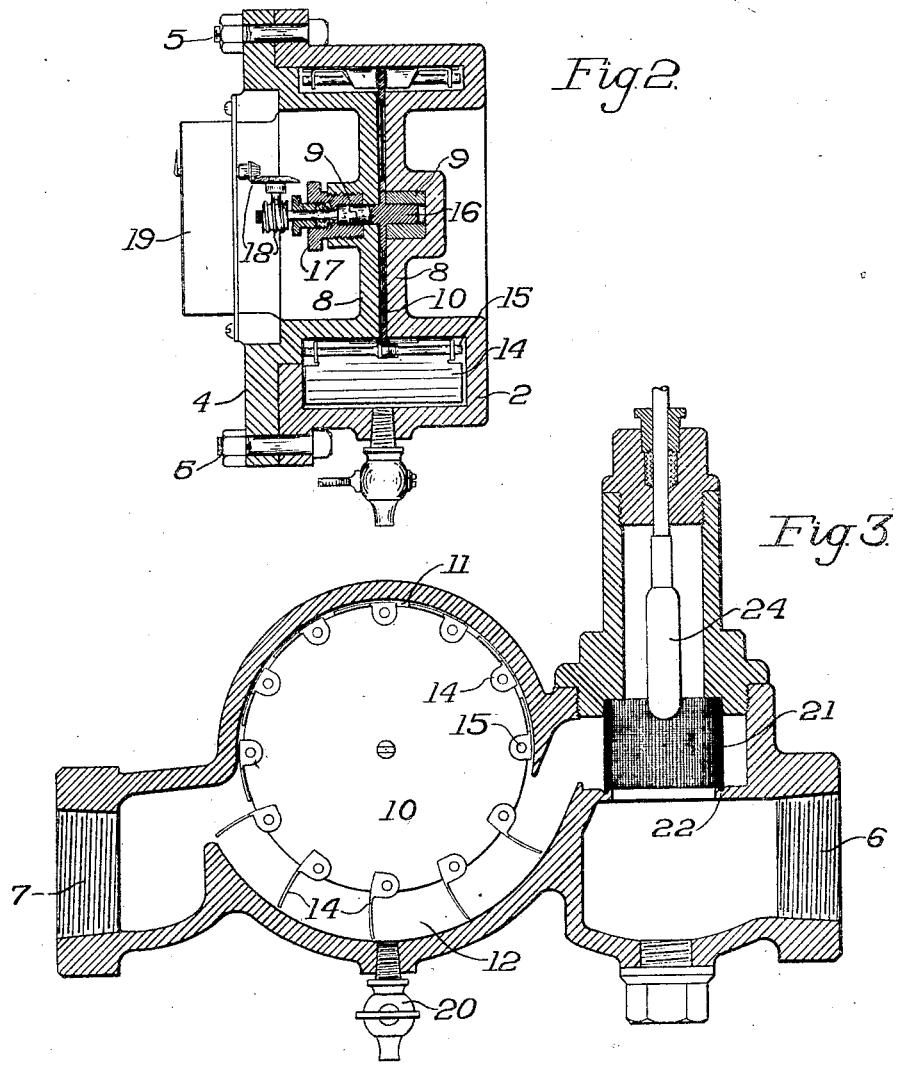
Aug. 26, 1924.  
W. I. STAAF  
FLUID METER  
Original Filed March 2, 1920    2 Sheets-Sheet 2
1,506,683

Patented Aug. 26, 1924.

1,506,683

UNITED STATES PATENT OFFICE.

WERNER I. STAAF, OF PITTSBURGH, PENNSYLVANIA, ASSIGNOR, BY MESNE ASSIGN-MENTS, OF ONE-HALF TO LULA HARRINGTON TYLER, OF PITTSBURGH, PENN-SYLVANIA.

FLUID METER.

Application filed March 2, 1920, Serial No. 362,853. Renewed January 26, 1924.

*To all whom it may concern:*

Be it known that I, WERNER I. STAAF, a citizen of the United States, residing at Pittsburgh, Allegheny County, Pennsylvania, have invented a new and useful Improvement in Fluid Meters, of which the following is a full, clear, and exact description, reference being had to the accompanying drawings, forming part of this specification, in which—

Figure 2 is a cross section through the main body of the meter chamber, and

Figure 3 is a longitudinal section at right angles to Figure 2.

Figure 1:
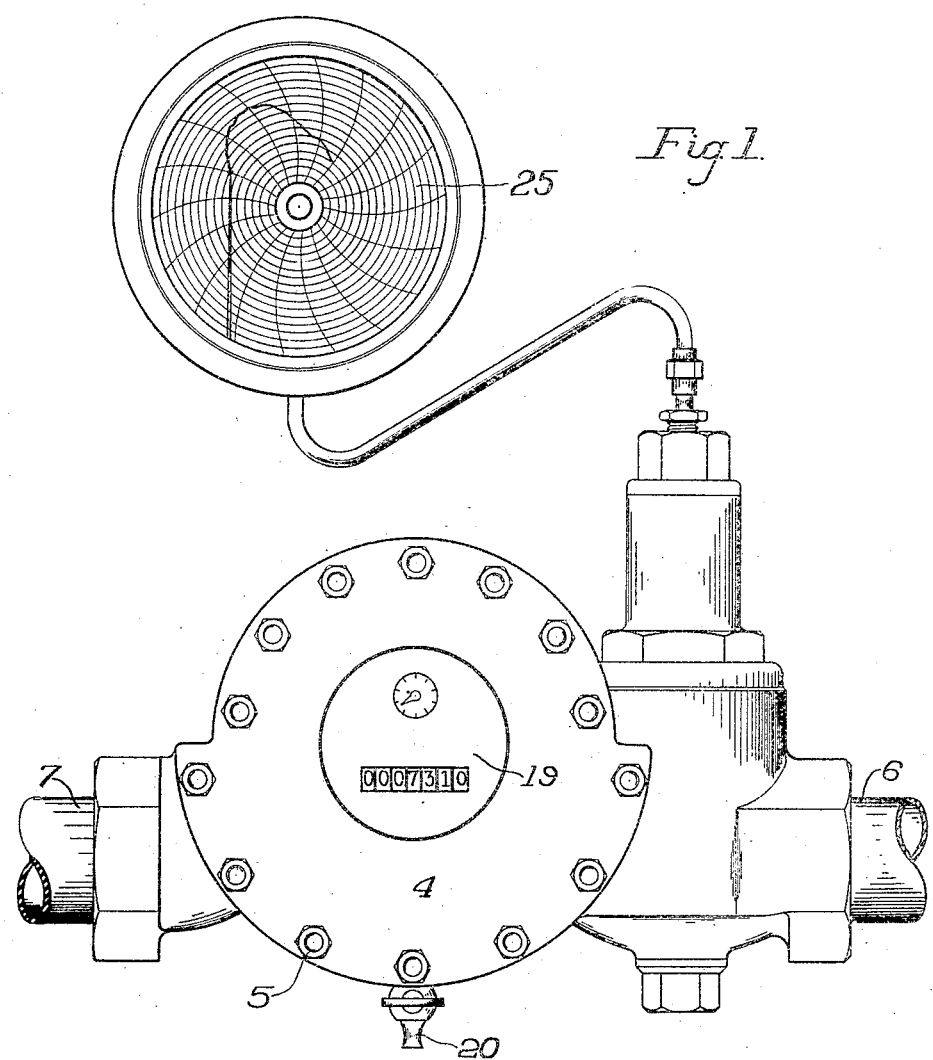
Figure 1 is a front plan view of a meter constructed in accordance with the present invention having a temperature recording device connected thereto.

The present invention relates broadly to fluid meters and more particularly to meters adapted for use in connection with steam heating systems for measuring hot water, although the use in this respect is not limited, as the meters are equally adaptable to any system or line employing hot water.

The important object of the present invention is to provide a durable meter constructed in such manner that there are no corrosive or easily destructible parts exposed to the hot water or other fluid being metered.

Another object of the invention is to provide an efficient meter of simple construction and operation in which all of the parts are capable of resisting the deleterious action of the fluid passing therethrough.

Still another object of the invention is to provide a meter which may be readily assembled and used either with or without a filter and temperature recording device.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claim without departing from the spirit of the invention.

At the present time where steam is furnished for heating or other purposes, it is customary to charge for the same on the basis of the number of pounds furnished. This may be determined by means of a meter placed at some point in the system, such as a return, adapted to indicate the flow of water of condensation. The present meter is particularly adapted for use in this connection and is constructed entirely of metal, preferably high grade steam metal bronze, whereby a more durable construction is provided.

Referring more particularly to the drawings, the improved meter preferably comprises a back number 2 and a front member 4 suitably secured together as by means of the bolts 5. The back member 2 is preferably provided with an inlet connection 6 and an outlet connection 7, intermediate which both of the members are provided with inwardly extending circular abutments 8 and forming bearings 9 for the rotatable metal disk 10. The members 2 and 4 also preferably form two chambers 11 and 12, each partially surrounding the abutments 8, the chamber 12 being of slightly greater diameter than the chamber 11. The inlet and outlet connections in the back member 2 are preferably so disposed that they communicate directly with the end of the chamber of larger diameter.

Peripherally carried by the metal disk 10 is a series of swinging blades 14 each mounted for swinging movement on a pin or the like 15 extending through the disk and projecting beyond the opposite sides thereof. Due to the provision of the chambers 11 and 12 of different diameters, in the operation of the meter, the blades 14 will drop by gravity during their travel through the chamber 12 so as to extend entirely across said chamber and impart rotation to the disk 10 by the action of the fluid passing through the casing. As soon as the blades 14 pass the outlet connection 7 they will drop by gravity into a position substantially concentric with the disk and remain in this position throughout rotation through the chamber 11.

The disk 10 is also preferably provided on one end of the shaft 16 with a detachable driving connection 17 of any desired form adapted to co-operate with suitable mechanism 18 for actuating an indicator 19 which may be detachably secured to the front member 4. If desired, the chamber 12 may be provided with a drain valve 20 for emptying the chamber at will.

In the preferred embodiment of my invention, the incoming fluid is caused to pass through a filter 21 co-operating with a seat and completely closing the inlet end of the chamber 12. Such a filter prevents the passage of grit to the interior of the meter, thereby preventing excessive wear on the parts.

In some instance I may also desire to employ a temperature recording device in connection with the meter. In such cases the tube 24 carrying the expansible fluid may be extended into the inlet opening and preferably within the filter 21. This tube may be connected in any desired manner to a recording device 25, as clearly indicated in Figure 1 of the drawings.

The advantages of the present invention arise from a construction in which all of the parts are made of metal so that corrosion and other deleterious effects under the action of hot water are obviated. Further advantages arise from the provision of a structure which may be readily assembled and disassembled and which may be employed in connection with either a filtering device, a temperature recording device, or both.

I claim:

A fluid meter, comprising a casing composed of separable members, hollow circular abutments extending inwardly from each of said members and forming bearings, a disk rotatably mounted in said bearings, said members forming two chambers of unequal diameters each partially surrounding said abutments, swinging blades pivotally carried by said disk for rotation in said chambers, said blades extending radially of the disk when in the chamber of larger diameter and substantially concentric with the disk during rotation in the chamber of smaller diameter, inlet and outlet connections respectively communicating with the opposite ends of the chamber of larger diameter, a shaft carried by said disk and extending outwardly through one of said hollow abutments, an indicator, and means located within one of said hollow abutments and connecting said shaft to said abutments.

In testimony whereof I have hereunto set my hand.

WERNER I. STAAF.